United States Patent
Ganapathy (10) Patent No.: US 7,159,111 B1
(45) Date of Patent: Jan. 2, 2007

(54) ISOLATION OF COMMUNICATION CONTEXTS TO FACILITATE COMMUNICATION OF DATA

(75) Inventor: Narayanan Ganapathy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1067 days.

(21) Appl. No.: 09/772,231

(22) Filed: Jan. 29, 2001

(51) Int. Cl.
*H04L 9/00* (2006.01)

(52) U.S. Cl. .................... 713/167; 726/4; 709/212; 719/314

(58) Field of Classification Search ........... 713/201, 713/170
See application file for complete search history.

(56) References Cited

U.S. PATENT DOCUMENTS 5,808,911 A * 9/1998 Tucker et al. .............. 719/316
6,604,123 B1 * 8/2003 Bruno et al. ............... 718/100

OTHER PUBLICATIONS

Hac, A.; "A Distributed Algorithm for Managing Resources in a Hierarchical Network", *Journal of Systems and Software*, vol. 22, No. 3, p. 191-206.
Interim Release, *Infiniband Architecture Specification* vol. 1, Release 0.95, Jul. 30, 3000, p. 1-740.

* cited by examiner

*Primary Examiner*—Gilberto Barrón, Jr.
*Assistant Examiner*—Brandon Hoffman
(74) *Attorney, Agent, or Firm*—Amin, Turocy & Calvin, LLP (57) ABSTRACT

A system and method facilitate communication of data depending on whether communicating elements are properly associated with each other. An endpoint communication context is associated with a queue component, which queue component may communicate directly with a process. Each of the queue component and the endpoint communication context is associated with a domain in a privileged operation (e.g., by the operating system). The queue component may communicate with the endpoint communication context provided that the queue component and communication context have a valid association, such that their respective domains match.

34 Claims, 8 Drawing Sheets

ISOLATION OF COMMUNICATION CONTEXTS TO FACILITATE COMMUNICATION OF DATA

TECHNICAL FIELD

The present invention relates to data communication and, more particularly, the present invention relates to a system and method to isolate communication contexts to facilitate communication of data.

BACKGROUND

Various data communication infrastructures have been developed that enable a process or method to have requests processed by input/output (IO) devices. In such an infrastructure, for example, a client submits a request to a process operating in user-mode. The user-mode process submits a file retrieve command to a kernel-mode file server process. After receiving the file retrieve command, the kernel-mode file server process copies the file identified in the file retrieve command to a buffer in non-cache user addressable RAM. The kernel-mode file server process then informs the user-mode process of the completed file copy to the buffer. The user-mode process makes a separate system call to a transport protocol invoking a data transmit procedure for transmitting the buffered file to an identified destination, such as an IO device. The buffered file is then transmitted via the transport protocol.

At no time in such an infrastructure does the user-mode application or process that issued the request have direct access to hardware destinations. Instead, the operating system, operating in kernel mode, acts as an intermediary issuing the requests to the hardware via a corresponding communications protocol. As a result, IO requests and other interprocess communication usually involve a lengthy kernel code path to reach their intended destination, which imposes an undesirable delay.

Consequently, existing infrastructures have failed to adequately keep pace with computer evolution and the increased burden imposed on data servers, application processing, and enterprise computing created by the popular success of the Internet. In particular, high-end computing concepts such as clustering, fail-safe, and 24×7 availability demand greater capacity to move data between processing nodes as well as between a processor node and IO devices. These concepts usually require higher bandwidth and lower latencies, as they tend to push more functionality down to the IO device. Such concepts also demand greater protection, higher isolation, deterministic behavior, and a higher quality of service than conventionally available.

As a result, new architectures are being developed in which a user-level application or process may directly access hardware, such as to issue IO requests. However, by permitting an application or process direct access to hardware, issues may exist that (if not properly addressed) could compromise system integrity and/or performance.

By way of example, a data communication model has been developed in which a process operating in user mode is operable to employ a data transport service in which communication between associated hardware components is facilitated through communication contexts. The process first creates a queue pair and sets it to the appropriate type of service. The process obtains an endpoint communication context through a privileged operation, which can communicate with a given remote node address.

This model, however, does not enable the desired service type to be utilized with every application or process. In fact, if appropriate measures are not taken, it would be easier for a user-level process to potentially "starve" use of the same communication context by another process or kernel. This can be done for example by sending very large data transfers using that communication context. The current architecture does not provide a mechanism to control how many or which queue pairs are using a given communication context. This kind of a performance problem is not acceptable in a robust system, especially if one of the processes using the communication context is the operating system itself.

Therefore, it is desirable to provide a system and method to isolate communication contexts to facilitate communication of data.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

By way of background, the present invention may be implemented in a system architecture that allows user level input/output (IO) requests. For example, an application or process communicates directly with an associated hardware abstraction, called a queue component. The queue component stores outgoing and incoming messages for its associated process. The messages are communicated to and from the queue component through one or more local endpoint communication contexts. Each local endpoint communication context is associated with a remote endpoint communications context. The remote endpoint communications context is associated with at least one other application or process through a corresponding remote queue component. The remote endpoint communications context may be part of the same node or a different node from where the queue component and local endpoint communication context are located.

In accordance with an aspect of the present invention, each queue component and local endpoint communication context is associated with a domain. Communication between a given queue component and an endpoint communication context is controlled based on the domain with which each is associated. If there is not a match between the domains of the queue component and the communication context, communication between the queue component and the communication context is prevented.

By way of example, each queue component has a domain attribute having a domain value, such as may be set through a privileged operation by the operating system. Each endpoint communications context also has a domain attribute that is set in a secure manner. A user-mode process cannot adjust the domain attributes. For a message to be communicated between a queue component and a designated communications context, the domain attributes of the queue component and the designated endpoint communications context must match. the validation of domain associations, for example, may be implement by hardware at the corresponding node programmed and/or configured to perform such validation.

By way of further illustration, in order for a local process to communicate a message to a remote process, the local process provides the message to a local queue component associated with the local process. The message includes information identifying a local endpoint communication context through which the message is desired to be sent. In accordance with an aspect of the present invention, each of the local queue component and the local endpoint communication context belongs to a predetermined domain. If the local queue component and the local endpoint communication context identified in the message are not part of the same domain, the message is not processed and an error message may be generated. If the local queue component and the local endpoint communication context are part of the same domain, the message is communicated between the local queue component and communication context, which may then be communicated between the local and remote endpoint communication contexts.

In accordance with another aspect, the present invention enables endpoint communication contexts to be shared efficiently by queue pairs at a given node that are part of a common domain. Additionally, the present invention facilitates isolation between different applications by allowing different or unrelated applications to be part of different domains.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

One aspect of the present invention provides a system and method to facilitate communication of data. An endpoint communication context is associated with a storage component, which storage component may communicate directly with a process. Each of the storage device and the endpoint communication context is associated with a respective domain in a privileged operation (e.g., by the operating system). The queue component may communicate with the endpoint communication context provided that the storage device and communication context have a valid association, such that their respective domains match. Because membership to a domain is established in a privileged operation that is not accessible to user-level processes, communication channels in different domains are isolated from each other, thereby enhancing integrity of such communication.

Figure 1:
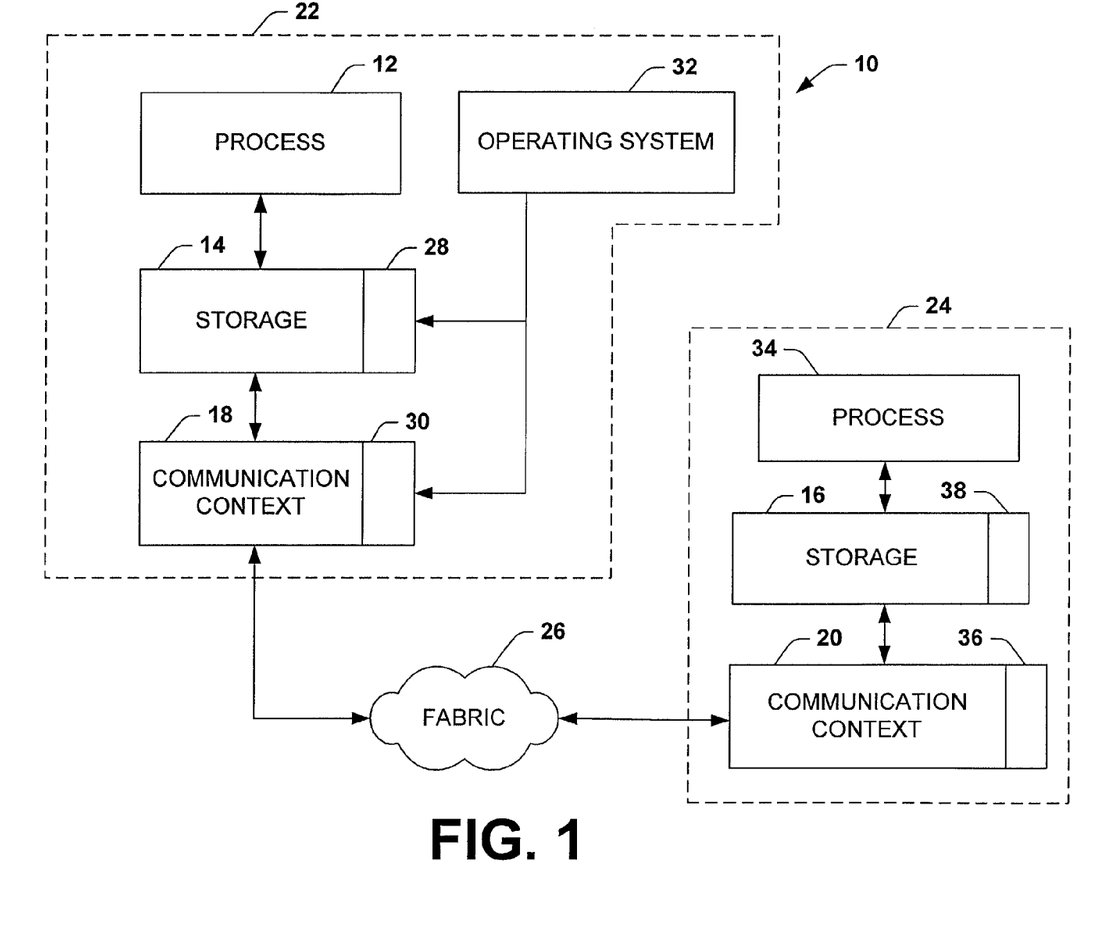
FIG. 1 is an example of a system operative to facilitate communication of data in accordance with the present invention.

Turning now to FIG. 1, a system 10 operable to facilitate substantially data communication, in accordance with an aspect of the present invention, is illustrated. The system 10 is programmed and/or configured to permit a user-level process 12 to directly access hardware, such as a storage component 14. Those skilled in the art will understand and appreciate other types of storage means (e.g., a buffer or queue, or the like) that could be utilized to receive messages from a user-level process in accordance with the present invention. The storage component 14 operates to temporarily store data being communicated relative the process 12. More particularly, the storage component 14 may communicate with one or more other storage components 16 through an associated pair of communication contexts 18 and 20, respectively.

By way of example, a reliable communication service type may be utilized, which reliably delivers a message, such as may include one or more data packets, from one of the storage components 14 to the other storage component 16 through a channel formed by the communication contexts 18 and 20. Each communication context 18, 20 may utilize sequence numbers and acknowledgements for each message to help ensure that messages are reliably communicated in the system 10. If a message cannot be communicated, a corresponding error message may be generated.

The storage component 14 and communication context 18 may reside at one node 22 and the component 16 and context 20 may be part of another node 24. However, those skilled in the art will understand and appreciate that such communication elements alternatively could be part of a common node in accordance with an aspect of the present invention. Additionally, more than one storage component and/or communication context could be created in a given node. Each communication context 18, 20 thus may be operative to multiplex messages from one or more respective storage components 14, 16 in its respective node 22, 24.

In the example of FIG. 1, the communication contexts 18 and 20 communicate over a communication fabric 26, although other types of communications means could be utilized for sending and/or receiving messages relative the storage 14. For example, the fabric 26 may be formed of links, routers, and/or switches that interconnect nodes 22 and 24 to form the system 10. While, for purposes of brevity, two nodes 22 and 24 have been illustrated as being interconnected by the fabric, those skilled in the art will understand and appreciate that almost any number of nodes (e.g., subject to limitations of the hardware and/or software being used) could form the system 10.

In accordance with an aspect of the present invention, each of the storage component 14 and the communication context 18 is assigned a domain to facilitate more secure communication of selected messages. A domain is an association that determines which storage component(s) may utilize which communication context(s). The domain is assigned in a privileged operation not accessible by the process 12.

For example, an operating system 32 at the node 22 may independently associate domain characteristics, schematically represented at 28 and 30, with each of the storage component 14 and the communication context 18, respectively. In a given node, more than one storage component may be associated with a given domain, such that the storage components can share one or more common communication contexts to communicate messages with a remote process 34. In addition, a single storage component 14 may utilize more than one communication context at the node 22, such as one for each remote node in the domain. Domain attributes 36 and 38 also may be respectively associated with each of the communication context 20 and the storage component 16 at the other node 24, in a similar privileged operation. In the absence of a proper association between the storage component and communication context at a given node, communication between the storage component and communication context is prevented. While the domain characteristics 28 and 30 provide an effective means for validating association between the respective storage component 14 and the communication context 18, those skilled in the art will understand and appreciate other means that could be utilized to validate such association in accordance with the present invention.

Figure 2:
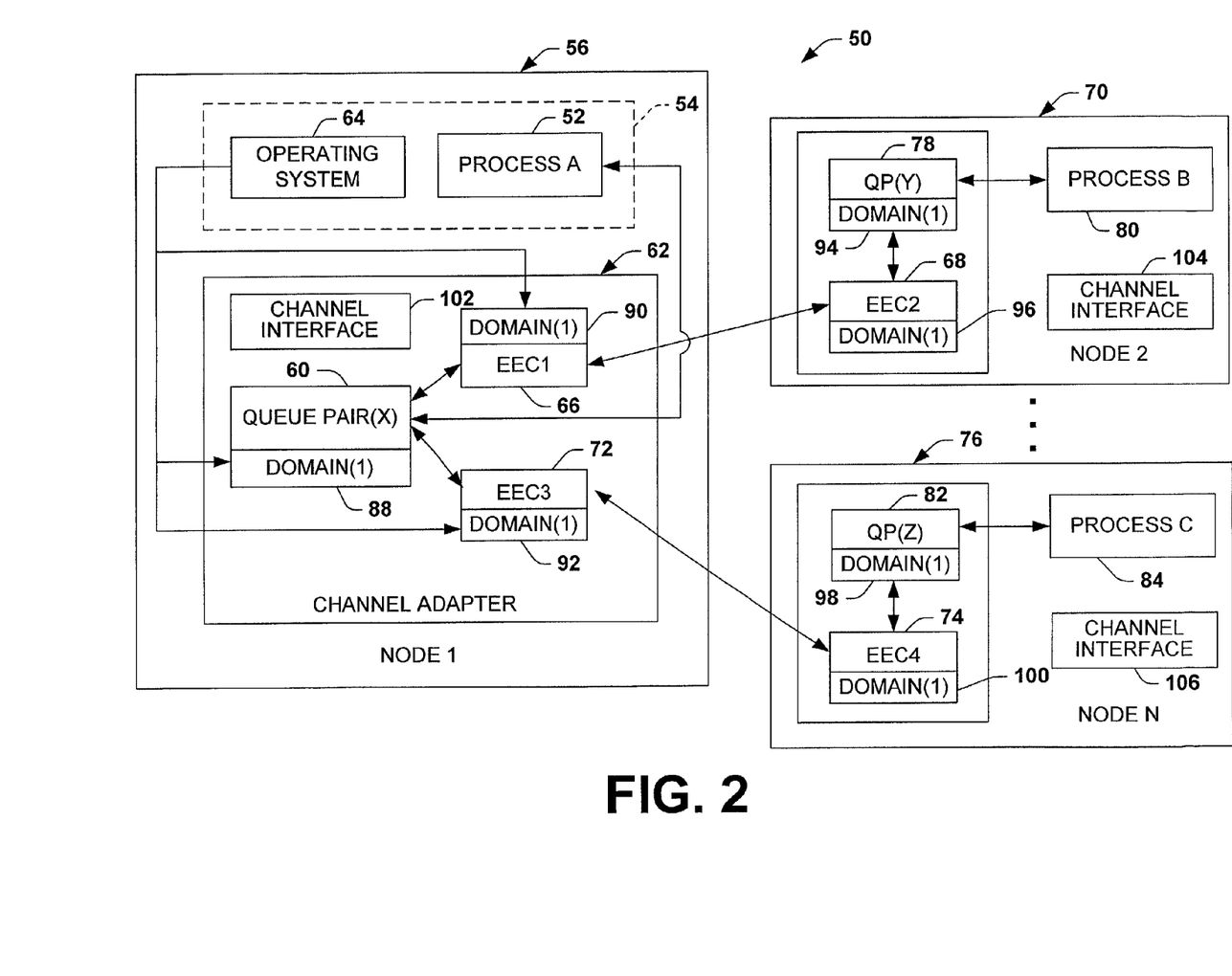
FIG. 2 is a functional block diagram illustrating a system operative to facilitate communication of data in accordance with the present invention.

FIG. 2 illustrates another example of a system 50, which is programmed and/or configured to facilitate substantially secure communication in accordance with an aspect of the present invention. The system 50 includes a user-level process (PROCESS A) 52, such as an application or program module, running on a computer 54 at a node (NODE 1) 56 of the system 50. The process 52 is operative to directly communicate a message, such as an IO request or other type of communication service, with a queue pair 60 located within a hardware device, such as a channel adapter 62.

The queue pair 60 is a hardware abstraction created to facilitate communication between applications and/or processes. The queue pair 60 may include a pair of queues, such as a send queue and a receive queue, for temporarily storing messages being respectively sent from or to the process 52. Each queue pair 60 within the channel adapter 62 has a queue pair value (e.g., a number) that uniquely characterizes each queue pair within the channel adapter 62. In this example, the queue pair 60 has a queue pair number represented by an "X". While the channel adapter 62 is shown and described as including storage means (e.g., the queue pair 60) for storing a message received from from a user-level process, it is to be understood that other types of hardware, software, or combinations of hardware and software could be utilized to store such data. For example, data could be stored in a stack, a buffer (FIFO or LIFO) or as one or more other data structures in appropriate data storage devices, such as volatile or non-volatile storage devices.

As mentioned above, the process 52 is operable to directly communicate with the queue pair 60. By way of example, an associated operating system 64 maps the respective queue pair 60 into a virtual address space associated with the process 52 to enable the direct access by the process to the queue pair 60. The process 52 thus is able to communicate directly with each queue of the queue pair 60, such as to send an IO request to an IO device or a message to another process, as well as to receive messages from other processes.

While, for purposes of brevity, the channel adapter 62 is illustrated as having a single queue pair 60, it is to be understood and appreciated that any number of queue pairs may exist in a channel adapter at any given time.

The system 50 is programmed and/or configured, for example, to employ a reliable type of communication service between the queue pair 60 and other similarly configured queue pairs occurs by establishing a communication channel. The communication channel consists of an end-point communication context at each endpoint of the communication channel. Each communication context may utilize sequence numbers and/or acknowledgements for each message to help ensure that messages are reliably communicated in the system 50.

In accordance with an aspect of the present invention, a queue pair can communicate through a communication context provided that the queue pair and the context are part of the same domain. Typically, there is one communication context in a given node for each remote node in a given domain for which a communication channel is established.

By way of illustration, the queue pair 60 of the node 56 is associated with a communication context (EEC1) 66 that is connected with a communication context (EEC2) 68 in a second node (NODE 2) 70. The queue pair 60 also is associated with a communication context (EEC3) 72 that is connected with a communication context (EEC4) 74 that resides in a yet another node (NODE N) 76. Thus, the contexts 66 and 68 form a communication channel between nodes 56 and 70, while contexts 72 and 74 form a communication channel between nodes 56 and 76. Each communication context has a context number (e.g., a multi-bit field), which uniquely identifies each context within its associated channel adapter.

In this example, the communication context 68 is associated with a queue pair 78 having a queue pair number "Y", which is connected to a process (PROCESS B) 80. Similarly, communication context 74 is associated with a queue pair 82 having a queue number "Z". The queue pair 82 is associated with a process (PROCESS C) 84. While, for purposes of brevity, each remote context 68, 74 is illustrated as being associated with a single queue pair 78, 82, it is to be understood and appreciated that each context could be associated with one or more queue pairs in its respective node 70, 76.

In order to facilitate substantially secure, reliable communication in the system 50, messages can be communicated between queue pairs and communication contexts provided that they are part of a common domain. For example, domain characteristics are associated with each queue pair and each communication context in a privileged operation, which characteristics are not accessible by user-level processes. As a result, a communication context may be isolated from a queue pair if their respective domain characteristics do not match (e.g., they are not members of a common domain).

In the example of FIG. 2, the operating system 64 (operating in kernel mode) associates the queue pair 60 with the communication contexts 66 and 72, so that they are part of the same domain, indicated as DOMAIN (1). The operating system 64 may perform the association by setting a domain attribute 88 of the queue pair 60, as well as setting respective domain attributes 90 and 92 of the communication contexts 66 and 72 to a common domain value. For example, the domain characteristics for each queue pair and communication context may be stored in the channel adapter 62 as a domain object, which provides an association between queue pairs and communication contexts. In this way, the operating system 64 may set domain characteristics to control communication of IO requests and other messages from the process 52 (or other processes) at the node 56.

Similarly, operating systems (not shown) may employ kernel-mode processes at nodes 70 and 76 to associate each respective queue pair 78, 82 and communication context 68, 74 with a domain, such as the DOMAIN (1), such as by setting (or modifying) domain attributes 94, 96, 98, 100 thereof to the appropriate value. The domain attributes may be stored as domain objects in each respective node 70, 76. As a result, communication of reliable messages may occur between processes 52 and 80 and processes 52 and 84 through established channels that are part of a common domain, namely, DOMAIN (1). Processes (or applications) cannot modify the domain attributes, as the attributes are inaccessible by such processes.

By way of example, each time the process 52 sends a message (e.g. an IO request), the message is stored in the queue pair 60 associated with the process. The queue pair 60 associated with the process is validated relative to the communication context 66, 72 designated in the message to ensure that a proper domain association exists. The process 52 selects the communication context 66 or 72 by passing a communication context number in the message. By way of further example, each node 56, 70, 76 may have a respective channel interface 102, 104, 106 for validating communication of messages between queue pairs and communication contexts in that node. The channel interface 102 is programmed and/or configured to validate communication of the message between the queue pair 60 and the designated communication context 66 or 72.

When the process 52 issues a message to a communication context that is not associated with the queue pair 60 on which the message was issued, the message is not processed and an error message may be generated. If the domain of the designated communication context matches the domain of the queue pair, the channel interface 102 permits the message to be communicated between the queue pair and the designated communication context. Such protocol applies to all packets that flow through a communication context. The channel interfaces 104 and 106 at the other nodes may control communication of messages from the processes in substantially similar manner.

While the channel interface 102 provides an effective means for enabling communication between the queue pair 60 and communications context 66, 92 according to the domain information, it is to be understood that other communication means (e.g., hardware and/or software) could be utilized to enable such communication in accordance with an aspect of the present invention. For example, such means could be part of a respective queue pair 60, part of the communications context 66, 92, or other hardware and/or software associated with the channel adapter 62.

As a result of implementing a system according to the present invention, overall system integrity is enhanced because an application (or process) is unable to send an IO request through a communication channel that is associated with (e.g., part of the domain of) one or more other applications or operating system software. In addition, system performance may be improved, as an application cannot arbitrarily pump messages through a communication channel. The domain further provides an effective mechanism by which communication contexts may be efficiently shared. By requiring at least two domains to be supported by the channel adapter 62, the operating system can separate kernel-level communication contexts from user-level communication contexts.

Figure 3:
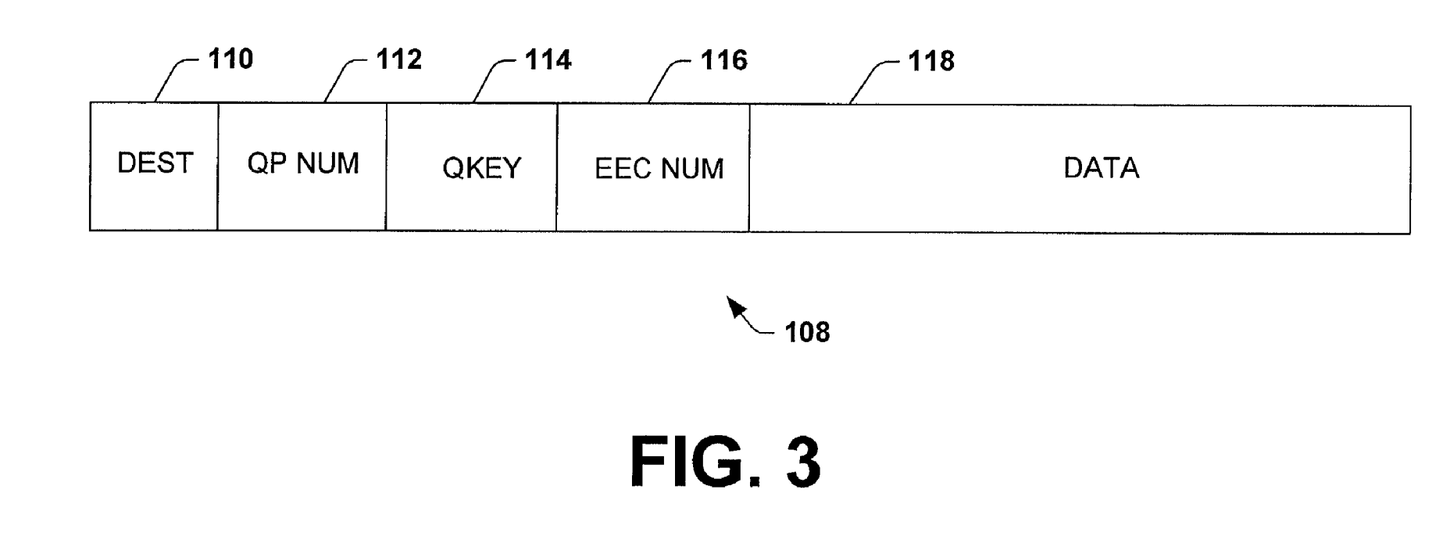
FIG. 3 is an example of a message that may be communicated in a system in accordance with the present invention.

FIG. 3 illustrates an example of a format for a message 108 that may be sent by a process (e.g., the process 52 of FIG. 2). The message 108 includes destination information 110, which may identify a channel adapter and a port thereof for which the message is intended. The port is a hardware device that connects the channel adapter to a communication fabric. Each channel adapter may include one or more such ports. A channel adapter ID, for example, may include a globally unique identifier (GUID), such as may be assigned by the channel adapter vendor. Each port of a channel adapter also may have a port GUID. Thus, the destination information 110 may include a port address and the channel adapter ID. A port address may be defined as a combination of a global ID, such as may be in the format of an IPv6 address, and a local ID. The local ID may be assigned by a local subnet manager, which implements an address resolution process. Those skilled in the art will understand and appreciate various address configurations that may be utilized to establish a communication service.

The message 108 also includes a queue pair number 112 that uniquely identifies a destination queue pair within a given channel adapter. A global address for a queue pair thus may be defined as the queue pair number and corresponding destination information. An example of a suitable addressing scheme that may be utilized in accordance with an aspect of the present invention is described in InfiniBand™ Architecture Specification, Vol. 1–3, Release 1.0, which is available on the Internet at http://www.infinibandta.org as published by the InfiniBand™ Trade Association and which is incorporated herein by reference.

The message 108 also may include a Qkey 114. The Qkey 114 is a construct employed to validate access rights to a destination receive queue, such as indicated by the destination data 110 and queue pair number 112. The Qkey 114 has a value, which is provided by the application or process sending the message. For example, the Qkey 114 is multi-bit value. If a message 108 does not include a Qkey having a value that matches a corresponding key value stored in a recipient queue pair, the message 108 may be dropped as being invalid, such as by a channel interface at the destination channel adapter.

The message 108 further includes and end-to-end context number (EEC NUM) 116 that identifies an endpoint communication context corresponding to a communication channel through which the message is being sent. The channel interface may employ the communication context number 116 to determine whether a queue pair to which the process sends the message 108 is properly associated with the designated communication context. For example, a channel interface may control sending of the message by accessing a corresponding domain object to determine whether the queue pair and designated communication context are part of the same domain. If the message is validated (e.g., the domains of the queue pair and communication context match), the data is permitted to be sent between the queue pair and the designated communication context. If the association is not properly validated, the message 108 may be dropped and an error message returned to the process that sent the message. The message also includes data 118 that contains an actual request or other information to be processes by a destination process or IO device.

Figure 4:
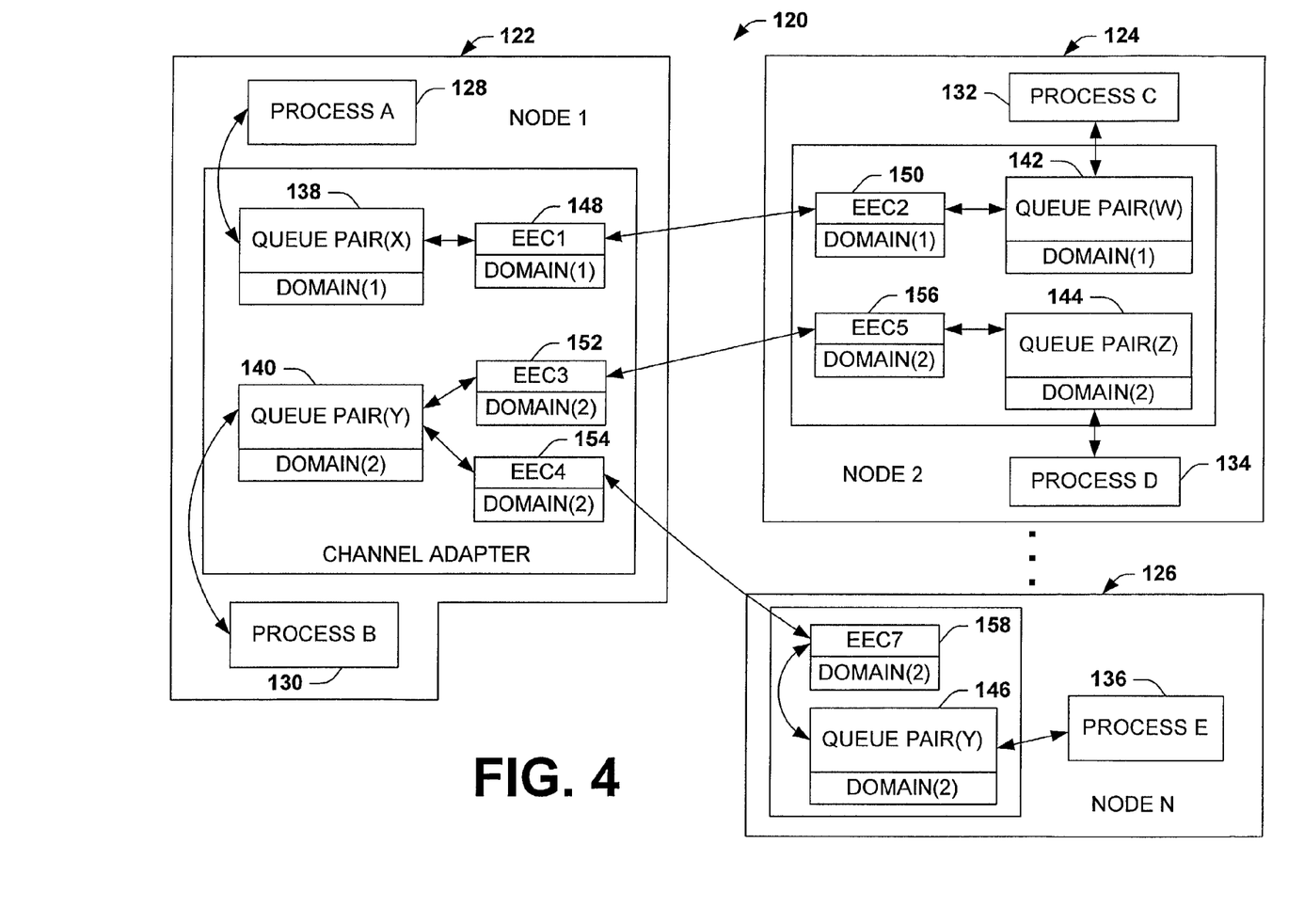
FIG. 4 is a functional block diagram illustrating another system operative to facilitate communication of data in accordance with the present invention.

FIG. 4 illustrates another example of system 120 that may be implemented in accordance with an aspect of the present invention. The system 120 includes a plurality of nodes 122, 124, and 126. Each node has at least one process running in the node. For example, two processes (PROCESS A) 128 and (PROCESS B) 130 run at the node 122, two processes (PROCESS C) 132 and (PROCESS D) 134 run at the node 124, and one process (PROCESS E) 136 runs at the node 126. The process 128 is operative to communicate directly with hardware, such as a hardware abstraction, called a queue pair 138, which that has been mapped into memory of the process 128. Similarly, a queue pair 140 is mapped into the application context of the process 130. In the node 124, a queue pair 142 is mapped into the context of the process 132 and a queue pair 144 is mapped into the context of the process 134. The process 136 also is associated with a queue pair 146 at the node 126.

Each queue pair communicates with another queue pair through an established communication channel, which is formed of a pair of end-to-end contexts (designated "EEC"). Each EEC has an EEC number, which may be a multi-bit field that uniquely characterizes each EEC within a channel adapter. Each queue pair is associated with one EEC for each remote node with which communication is to occur. In the absence of a proper association between a queue pair and an EEC, a message is not processed and an error may be returned to the process that sent the message. The association for each queue pair and each EEC is set up by an operating system in kernel mode in a secure manner so that an application cannot modify the association.

In the example of FIG. 4, the queue pair 138 is associated with an EEC 148 having an EEC number of 1. A communication channel is established between the EEC 148 and another EEC 150, which has an EEC number of 2. In accordance with an aspect of the present invention, communication is enabled between the queue pairs 138 and 142 by associating the queue pairs and EECs with each other to form an isolated domain, indicated as DOMAIN(1). The domain characteristics for each node may be stored as a domain object in each channel adapter in which the EEC-queue pair association exists.

The queue pair 140 is associated with two different EECs, namely EEC3 152 and EEC4 154. A communication channel is established between the EEC3 152 and an EEC (EEC5) 156 at the node 124 to enable communication between the queue pairs 140 and 144. Similarly, a communication channel is established between the EEC 154 and an EEC (EEC7) 158 at the node 126 to enable communication between queue pair 140 and the queue pair 146. In accordance with an aspect of the present invention, the queue pairs 140, 144, 146 and the EECs 152, 154, 156, and 158 are associated, such as to be part of common domain indicated as DOMAIN (2). The members of DOMAIN(2) are isolated from members of DOMAIN(1), such that their respective processes cannot send messages through communication channels in the different domain.

While the system 120 illustrates different processes 128 and 130 communicating through isolated queue pairs and EECs that are in different domains (e.g., DOMAIN(1) and DOMAIN(2)), it is to be understood and appreciated that processes within a given node also may, in accordance with the present invention, be part of a common domain and, in turn, share an EEC to communicate with a queue pair at a different node.

Figure 5:
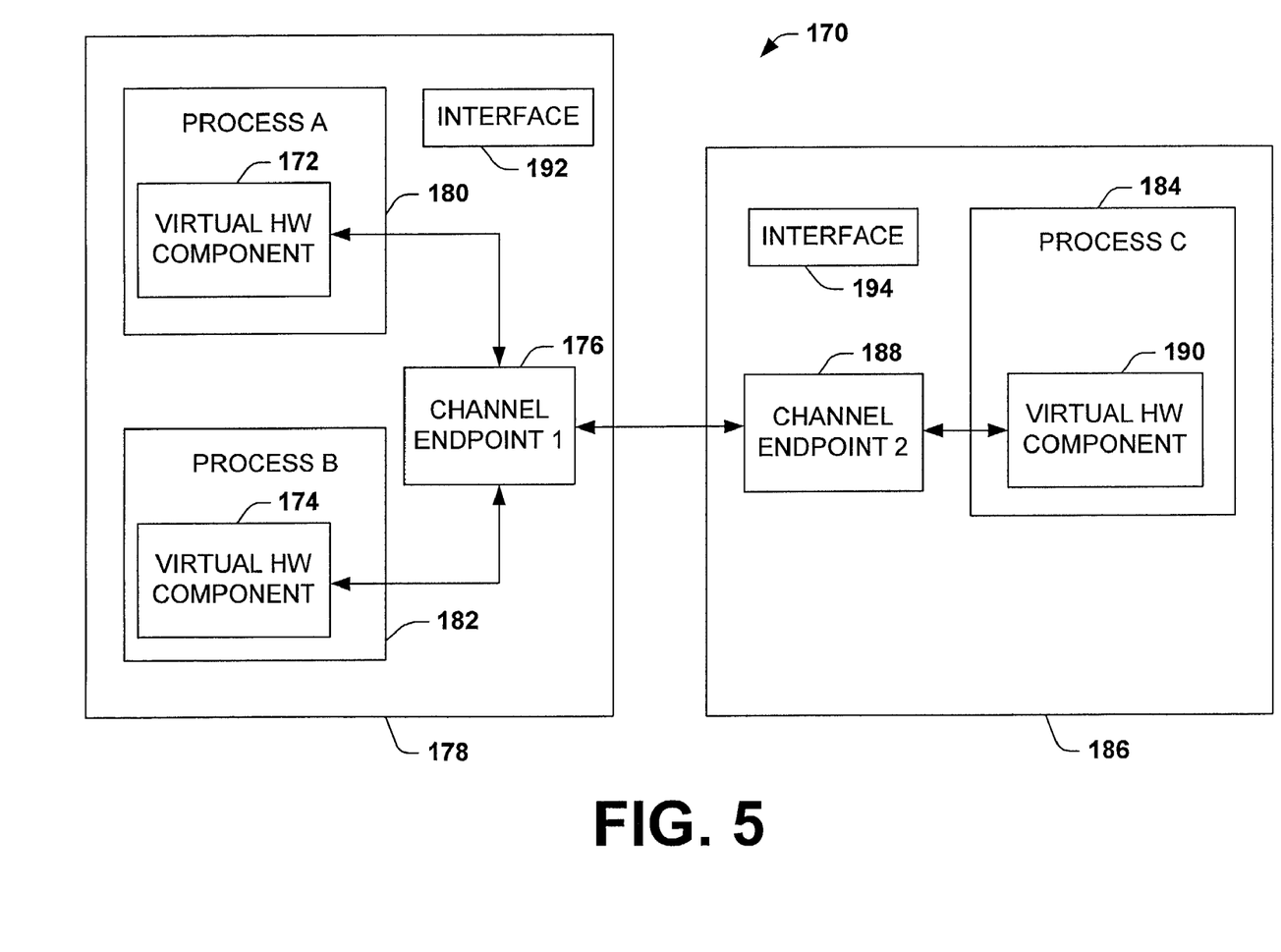
FIG. 5 is a functional block diagram of yet another system operative to facilitate communication of data in accordance with the present invention.

FIG. 5 depicts an example of a system 170 in which more than one virtual hardware component 172, 174 share an endpoint 176 of a communication channel at a node 178. The virtual hardware component 172 is illustrated as residing in virtual memory of a process (PROCESS A) 180 and the virtual hardware component (174) resides in virtual memory of another process (PROCESS B) 182. The hardware components 172 and 174, which may correspond to a queue pair, a buffer or other suitable storage means, for example, are mapped into the context of the respective processes 180 and 182 in a privileged operation by an operating system (not shown).

Each of the virtual hardware components 172, 174 is associated with the channel endpoint 176 in accordance with an aspect of the present invention (e.g., the virtual hardware components share the same domain). For example, a kernel mode process may be programmed to modify (or allocate) domain attributes stored at the node 178 so that the virtual components 172 and 174 as well as the channel endpoint 176 become part of a common domain. As a result, each process 180, 182 may directly access its associated hardware component 172, 174 to send a message to another process 184 at a different node 186.

A communication channel is established between the channel endpoint 176 and another channel endpoint 188 at the node 186. The channel endpoint 188 is part of the same domain as the channel endpoint 176. The channel endpoints 176 and 188 thus are isolated from (or unavailable to) processes not having a virtual hardware component that belongs to the same domain. The channel endpoint 188 is associated with a virtual hardware component 190 that has been mapped into the context of the process 184 through a privileged operation not accessible to the process 184. The process 184, thus, may communicate directly with the associated hardware component 190 and, in turn, with processes 172 and/or 174.

In order for a message to be communicated between one of the virtual hardware components 172, 174 and the channel endpoint 176, an interface 192 at the node 178 is programmed and/or configured to validate the association between the component and the endpoint. A similar interface 194 is utilized to validate communication of messages between the channel endpoint 188 and the virtual hardware component 190. As a result, the association affords isolation of endpoints between different processes, as a hardware component having in one domain cannot communicate with a channel endpoint of a different domain. Consequently, a process (or application) cannot send a request through the communication channel 176, 188 that is meant for use by one or more other applications (e.g., no cross-domain communication).

In view of the foregoing, it is to be appreciated that the channel endpoint 176 provides an effective means for enabling communication between a virtual hardware component 172, 174 and the channel endpoint 176 provided there is common domain membership for the channel endpoint and the respective hardware component. Those skilled in the art will understand and appreciate other means, e.g., hardware and/or software, which could be utilized to enable (permit or prevent) such communication in accordance with an aspect of the present invention.

Those skilled in the art will understand and appreciate various situations in which it may be desirable for applications to share a channel endpoint. Numerous privileged control algorithms to control allocating and deallocating channel endpoints may be utilized to control domain membership, all of which are contemplated as being within the scope of the present invention.

Figure 6:
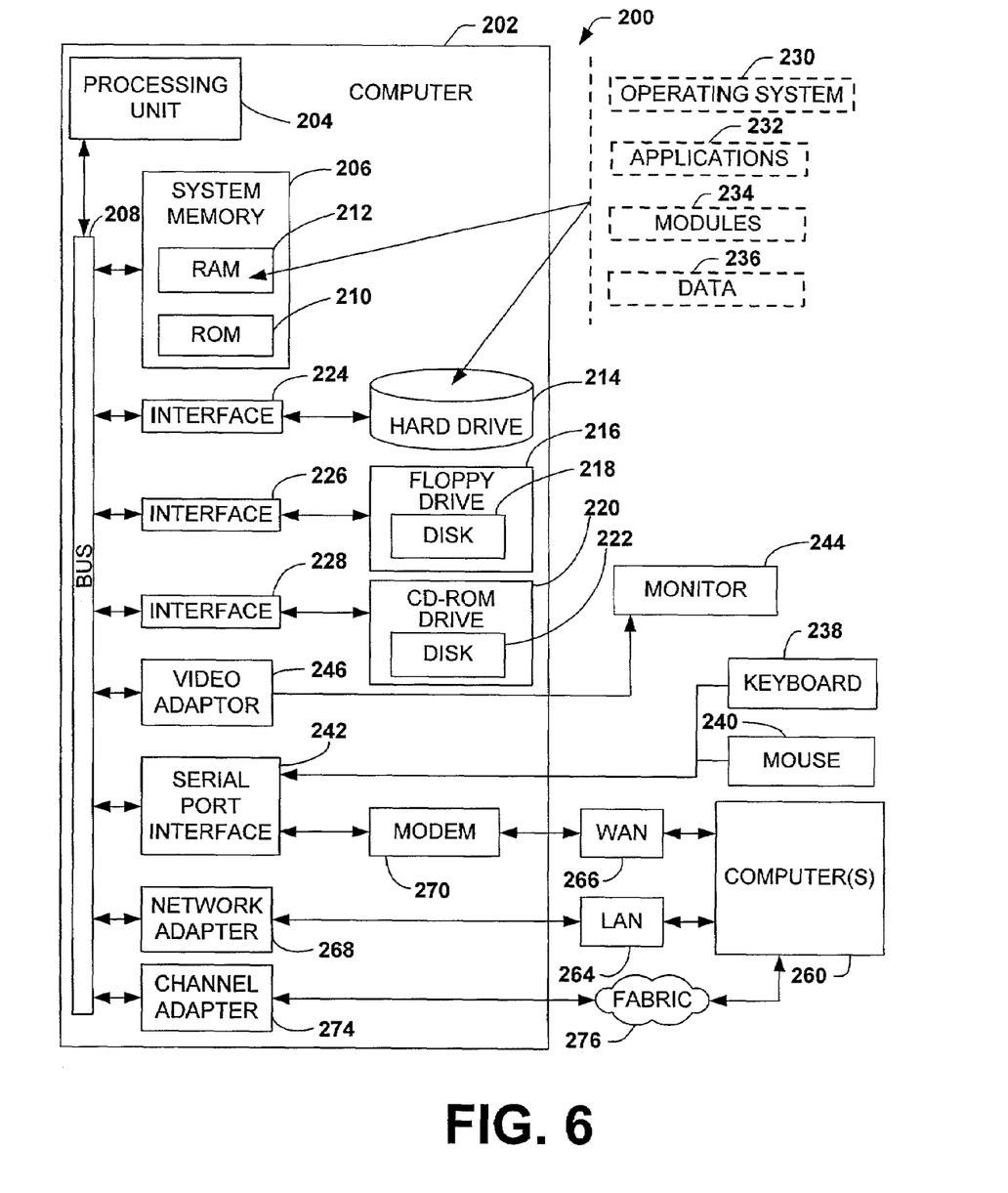
FIG. 6 is an example of an operating environment for a system implemented in accordance with the present invention.

In order to provide additional context for the various aspects of the present invention, FIG. 6 and the following discussion are intended to provide a brief, general description of a suitable computing environment 200 in which the various aspects of the present invention may be implemented. Additional context may be provided with reference to the above-incorporated InfiniBand™ Architecture Specification.

While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules or processes may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component.

With reference to FIG. 6, an exemplary system environment 200 for implementing the various aspects of the invention includes a conventional computer 202, including a processing unit 204, a system memory 206, and a system bus 208 that couples various system components including the system memory to the processing unit 204. The processing unit 204 may be any of various commercially available processors. Dual microprocessors and other multi-processor architectures also may be used as the processing unit 204.

The system bus 208 may be any of several types of bus structure including a memory bus or memory controller, a peripheral bus, and a local bus using any conventional bus architectures such as PCI, VESA, Microchannel, ISA, and EISA, to name a few. The system memory includes read only memory (ROM) 210 and random access memory (RAM) 212. A basic input/output system (BIOS), containing the basic routines that help to transfer information between elements within the computer 202, such as during start-up, is stored in ROM 210.

The computer 202 also may include, for example, a hard disk drive 214, a magnetic disk drive 216, e.g., to read from or write to a removable disk 218, and an optical disk drive 220, e.g., for reading from or writing to a CD-ROM disk 222 or other optical media. The hard disk drive 214, magnetic disk drive 216, and optical disk drive 220 are connected to the system bus 208 by a hard disk drive interface 224, a magnetic disk drive interface 226, and an optical drive interface 228, respectively. The drives and their associated computer-readable media provide nonvolatile storage of data, data structures, computer-executable instructions, etc. for the computer 202. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment 200, and further that any such media may contain computer-executable instructions for performing the methods of the present invention.

A number of program modules may be stored in the drives and RAM 212, including an operating system 230, one or more application programs 232, other program modules 234, and program data 236. The operating system 230 in the illustrated computer may be any suitable operating system or combinations of operating systems.

A user may enter commands and information into the computer 202 through one or more user input devices, such as a keyboard 238 and a pointing device (e.g., a mouse 240). Other input devices (not shown) may include a microphone, a joystick, a game pad, a satellite dish, a scanner, or the like. These and other input devices are often connected to the processing unit 204 through a serial port interface 242 that is coupled to the system bus 208, but may be connected by other interfaces, such as a parallel port, a game port or a universal serial bus (USB). A monitor 244 or other type of display device is also connected to the system bus 208 via an interface, such as a video adapter 246. In addition to the monitor 244, the computer 202 may include other peripheral output devices (not shown), such as speakers, printers, etc.

The computer 202 may operate in a networked environment using logical connections to one or more remote computers 260. The remote computer 260 may be a workstation, a server computer, a router, a peer device or other common network node, and typically includes many or all of the elements described relative to the computer 202, although, for purposes of brevity, only a memory storage device 262 is illustrated in FIG. 6. The logical connections depicted in FIG. 6 may include a local area network (LAN) 264 and a wide area network (WAN) 266. Such networking environments are commonplace in offices, enterprise-wide computer networks, intranets and the Internet.

When used in a LAN networking environment, the computer 202 is connected to the local network 264 through a network interface or adapter 268. When used in a WAN networking environment, the computer 202 typically includes a modem 270, or is connected to a communications server on the LAN, or has other means for establishing communications over the WAN 266, such as the Internet. The modem 270, which may be internal or external, is connected to the system bus 208 via the serial port interface 242. In a networked environment, program modules depicted relative to the computer 202, or portions thereof, may be stored in the remote memory storage device 262. It will be appreciated that the network connections shown are exemplary and other means of establishing a communications link between the computers 202 and 260 may be used.

By way of further illustration, the computer 202 may include a channel adapter 274 that interfaces the computer and its associated IO devices and applications running in memory with a communications fabric 276. The communications fabric 276, for example, may include a collection of links, switches and routers that interconnect a plurality of channel adapters. The remote computer 260 thus may communicate with the computer 202 via the communications fabric 276. Various other IO modules and/or computers (not shown) further may communicate with the computer 202 via the fabric, such as in accordance with the substantially secure communication services scheme described herein.

In accordance with the practices of persons skilled in the art of computer programming, the present invention has been described with reference to acts and symbolic representations of operations that are performed by a computer, such as the computer 202 or remote computer 260, unless otherwise indicated. Such acts and operations are sometimes referred to as being computer-executed. It will be appreciated that the acts and symbolically represented operations include the manipulation by the processing unit 204 of electrical signals representing data bits which causes a resulting transformation or reduction of the electrical signal representation, and the maintenance of data bits at memory locations in the memory system (including the system memory 206, hard drive 214, floppy disks 218, CD-ROM 222, and shared storage system 210) to thereby reconfigure or otherwise alter the computer system's operation, as well as other processing of signals. The memory locations where such data bits are maintained are physical locations that have particular electrical, magnetic, or optical properties corresponding to the data bits.

Figure 7:
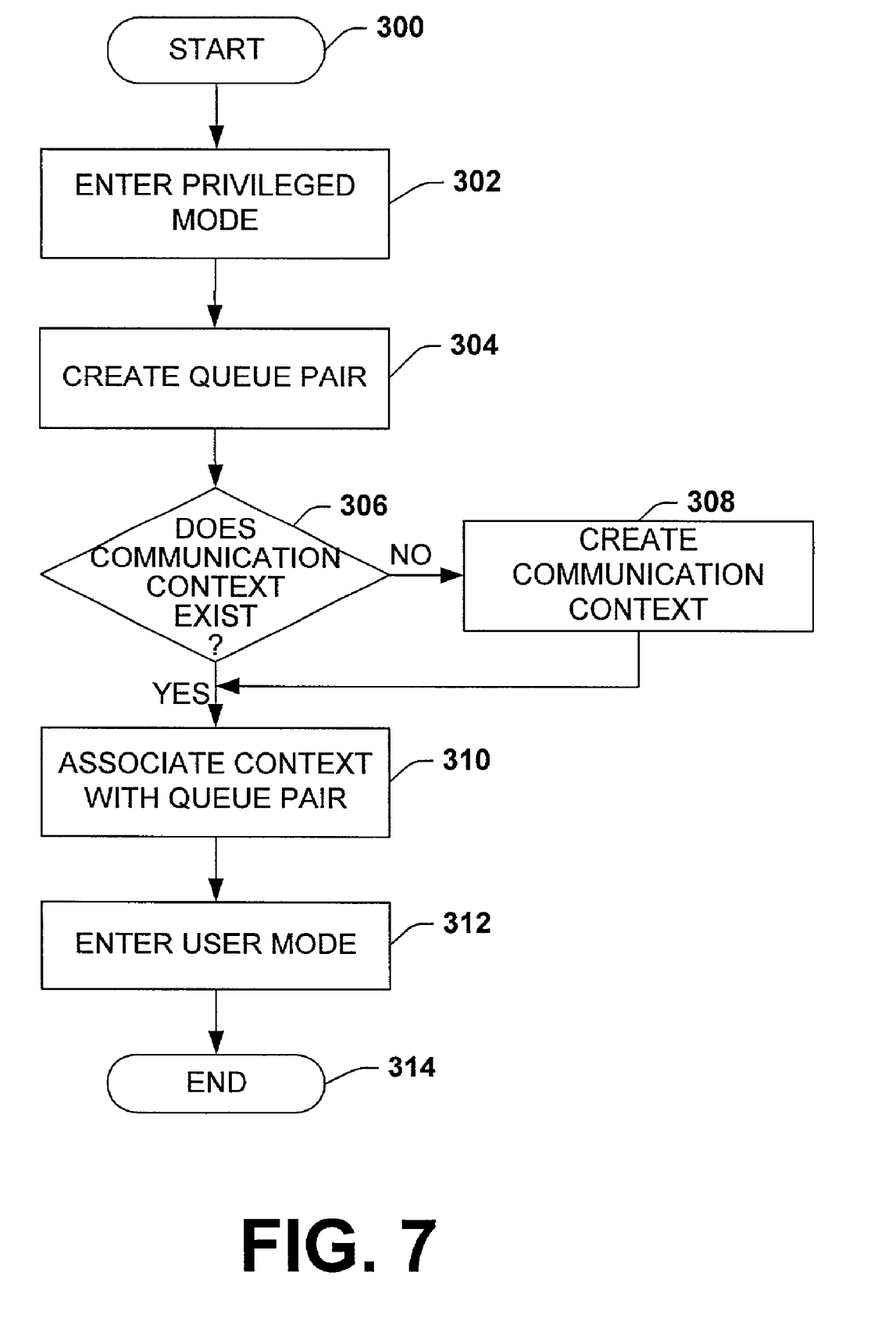
FIG. 7 is a flow diagram illustrating a methodology to configure part of a system to operate in accordance with the present invention.
Figure 8:
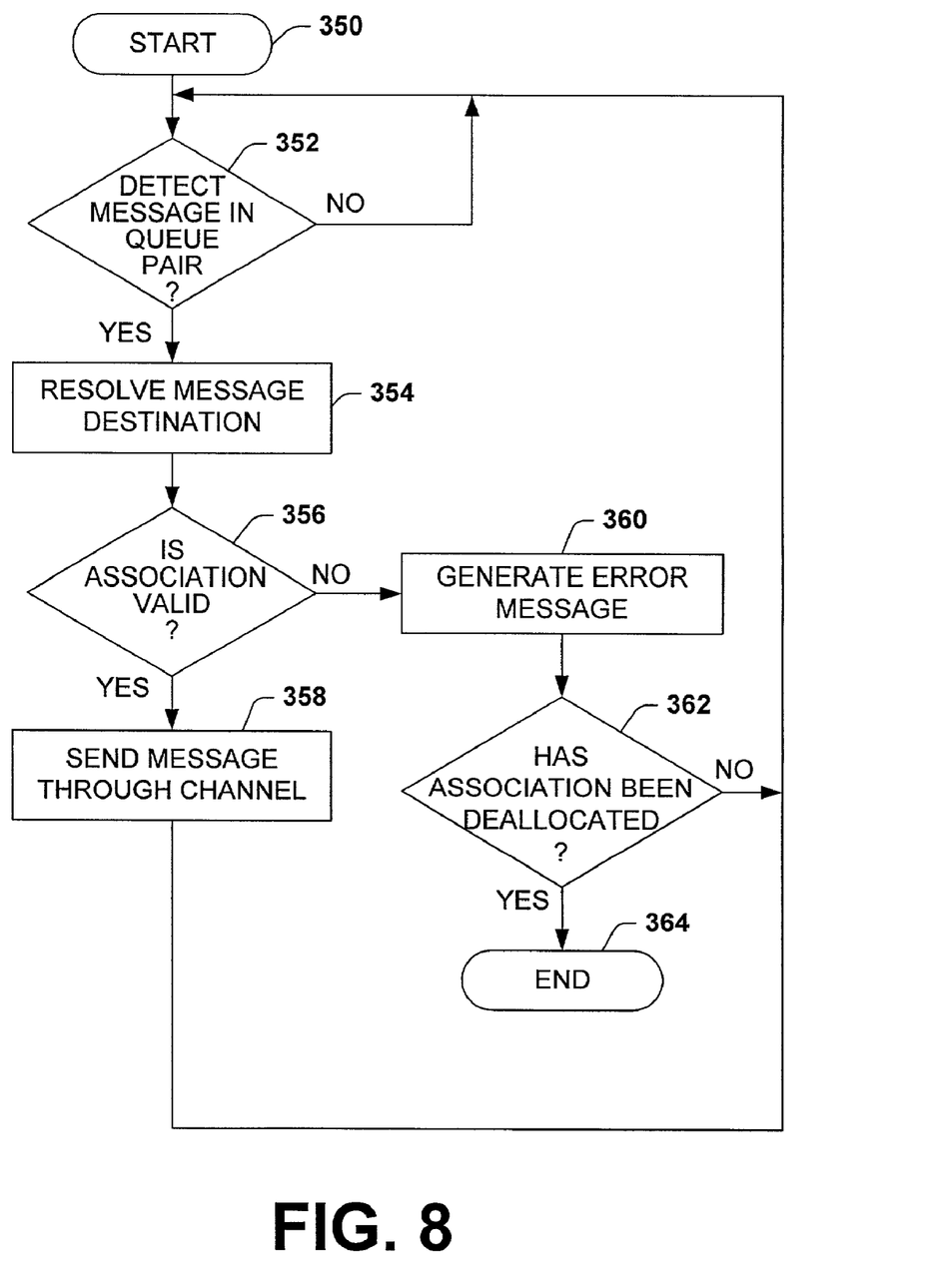
FIG. 8 is a flow diagram illustrating a methodology of data communication in accordance with the present invention.

In view of the foregoing structural and functional features described above, methodologies in accordance with various aspects of the present invention will be better appreciated with reference to FIGS. 7 and 8. While, for purposes of simplicity of explanation, the methodologies of FIGS. 7 and 8 are shown and described as a series of steps, it is to be understood and appreciated that the present invention is not limited by the order of steps, as some steps may, in accordance with the present invention, occur in different orders and/or concurrently with other steps from that shown and described herein. Moreover, not all illustrated steps may be required to implement a methodology in accordance with an aspect the present invention. It is to be understood and appreciated that the following methodologies may be implemented as computer-executable instructions in a computer readable medium.

FIG. 7 illustrates a methodology that may be implemented to program and/or configure communication components to facilitate communication in accordance with an aspect of the present invention. The methodology may be implemented in a system architecture that permits user-level applications or processes to communicate directly with hardware, such as by mapping the hardware into virtual memory space associated with such processes.

The methodology begins at step 300 in which a user-level application or process is initiated. Next, at step 302, a privileged mode is entered, such as in which the operating system in kernel mode is operable to perform privileged operations not available to user-level processes. For example, a kernel mode may be entered in response to the process requesting a communication channel to send a message (e.g., an IO request) to a process at another node in the system.

The methodology proceeds to step 304 in which a queue pair is created, provided that sufficient resources exist. The queue pair is a hardware abstraction with which the user-level application or process may directly communicate by mapping the queue pair into memory of the process. The queue pair includes one or more storage devices (e.g., queues or buffers) for temporarily storing data to be sent or data that has been received from another associated queue pair.

From step 304, the methodology proceeds to step 306 in which a determination is made as to whether a communication context exists that would be available to communicate messages relative to the queue pair and a desired destination, such as identified by the message. If a suitable communication context does not exist, the methodology proceeds to step 308 in which a communication context is created. The communication context is an endpoint of a communication channel established between two nodes in the system. From step 308, the process proceeds to step 310. Also, if the determination at step 306 is affirmative, indicating that a useable communication context already exists, the process proceeds to step 310.

At step 310, the communication context is associated with the queue pair. The association, which may be referred to as a domain, enables the queue pair to utilize the communication context for communication of messages to and from a desired destination node. One or more applications at a node may share a communication context for communicating messages relative to a common destination node. The act of association may include modifying attributes of the queue pair to specify a domain that matches that of the communication context. The domain attributes may be stored as a domain object in hardware (e.g., a channel adapter) in which the communication context and queue pair are associated.

After the association has been completed, the process proceeds to step 312 in which the privileged mode is ended and a user mode begins. From step 312, the methodology for associating the queue pair and communication context ends. As just mentioned, more than one queue pair may share the communication context and, in turn, communicate over the communication channel defined by the communication context in the local node and a remote communication context at another node. The shared association occurs in a similar manner, such as by modifying domain attributes of the other queue pair(s) to match that of the communication context. The communication components (e.g., queue pairs, communication contexts) that are part of a common domain are isolated from other communication components that belong to different domains.

FIG. 8 illustrates a methodology for communicating messages in a system that has been programmed and/or configured in accordance with an aspect of the present invention. The methodology begins at step 350 in which a process directly communicates a message to a hardware component, such as a queue pair, which has been mapped into virtual memory space of the process to enable direct between such hardware and the process. The message, for example, includes destination information and a context ID that identifies a selected communication context (e.g., by context ID) through which the message is to be sent. The methodology proceeds to step 352.

At step 352 a determination is made as to whether a message has been detected in the queue pair. The determination, for example, is performed by hardware (e.g., a channel interface) in a channel adapter wherein the queue pair resides. If a message is not detected in the queue pair, the methodology returns to steps 352. If a message is detected in the queue pair, the methodology proceeds to step 354.

At step 354, the destination of the message is resolved based on information stored at the node and the information contained in the message. The destination resolution, for example, is implemented as computer-executable instructions at the queue pair that defines procedures for placing data stored therein. An appropriate endpoint communication context is discerned from the message data, which, in turn, defines a communication channel through which the message may be communicated. The methodology proceeds to step 356.

At step 356, a determination is made as to whether a valid association exits between the queue pair and the endpoint communication context determined at step 354. If the association is valid, indicating that the domains for the queue pair and the endpoint communication context match, the methodology proceeds to step 358. At step 358, the message is sent through a corresponding communication channel. The communication channel is established between the associated endpoint communication context and another endpoint communication context at another node. Thus, the message is transported through the channel according to the configuration of network infrastructure (e.g., fabric) that interconnects hardware in which the associated communication contexts reside. From step 358, the methodology returns to step 352 to detect another message in the queue pair for communication.

If the determination at step 356 is negative, indicating that the association between the queue pair and the endpoint communication context is invalid, the methodology proceeds to step 360. For example, the association may be invalid when an application issues a request to an endpoint communication context (e.g., identified by context number in the message) that is not associated with the queue pair to which the request is issued. At step 360, the message is not processed and an error message is generated, such as may be returned to the issuing process. From step 360, the methodology proceeds to step 362.

At step 362, a determination is made as to whether the association between the queue pair and the communication context has been deallocated or whether the queue pair itself has been removed. If the determination is affirmative, the methodology returns to step 352 to detect another message in the queue pair for communication. If the determination at step 362 is negative, such as deallocation of the association or removal of the queue pair by a kernel mode process in privileged mode, the methodology ends at step 364.

In view of the foregoing methodologies, in accordance with the present invention, it is to be understood and appreciated that overall system integrity is enhanced because selected communication contexts at a given node can be effectively isolated relative to other communication contexts. As a result, an application (or process) associated with a given queue pair can only communicate through a communication channel having a common domain association with the queue pair. In addition, system performance may be improved, as the methodologies mitigate applications arbitrarily pumping messages through a communication channel. Another advantage is that more than one queue pair may efficiently share communication contexts by allocating such queue pairs to a common domain. By requiring at least two domains to be supported by the channel adapter, the operating system further can separate kernel level communication contexts from user-level communication contexts.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system to facilitate secure communication of data from a user-level process, comprising:
    at least a first queue associated with a first process, such that the process is operative to directly communicate a message relative to the first queue; and
    a first communication context operative to communicate the message between the first queue and a second communication context;
    wherein communication between the first queue and the first communications context is controlled based on whether an appropriate association exists between the first queue and the first communications context, the association between the first queue and the first communications context being provided through a privileged operation not adjustable by the first process, the association between the first queue and the first communication context requires membership to a common domain.

2. The system of claim 1, wherein the first queue and the first communication context reside at a first node that is different from that of the second communication context.

3. The system of claim 2, further comprising an interface at the first node operative to validate messages communicated from the first queue to the first communication context.

4. The system of claim 3, wherein the interface is operative to prevent messages from being communicated from the first queue to the first communication context if an association mismatch exists between the first queue and the first communication context.

5. The system of claim 2, further comprising a second queue associated with a second process at the first node, such that the second process is operative to directly communicate a message to the second queue.

6. The system of claim 5, wherein the second queue is associated with the common domain through a privileged operation, such that the first and second queues can share the first communication context to communicate messages through a channel defined by the first communication context and the second communication context, each of the first and second queues being operative to communicate messages with at least one process at a node where the second communication context resides.

7. The system of claim 6, wherein the first process further comprises a process operating in a user mode and the second process comprises a process operating in a user mode.

8. The system of claim 5, further including a third communication context associated with the second queue through a privileged operation at the first node, the third communication context enabling communication between the third communication context and a fourth communication context that resides a node different from the first node.

9. The system of claim 8, wherein the common domain is a first domain, the association between the second queue and the third communication context corresponding to a second domain that is different from the first domain, wherein each communication channel established in the second domain is isolated from each channel established in the first domain.

10. The system of claim 1, wherein the first queue and the first communication context reside at a first node that is different from a second node at which the second communication context resides, the system further comprising a third communication context at the first node to enable communication of messages between the third communication context and a fourth communication context that resides at a third node that is different from the first node.

11. The system of claim 10, wherein the first queue is associated with the third communication context through a privileged operation, such that the first process is operative to communicate the message over a communication channel established between the third communication context and a fourth communication context that resides at the third node, which is different from the second node.

12. The system of claim 10, wherein the first queue and the first communication context are associated so as to be part of a first domain, the system further comprising a second queue is associated with a second process, the second queue being associated with a third communication context so as to be part of second domain that is isolated relative to the first domain.

13. A system to facilitate communication of data, comprising:
- a virtual hardware component at a first node operable to communicate a message received directly from an associated process; and
- a first channel endpoint established at the first node, the first channel endpoint being operative to communicate messages to a second channel endpoint residing at a second node;
- wherein each of the hardware component and the first channel endpoint is associated with a respective domain through a privileged operation at the first node, communication of messages between the virtual hardware component and the first channel endpoint being controlled based on validation of the respective domains for the virtual hardware component and the first channel endpoint being a common domain.

14. The system of claim 13, wherein hardware at the first node is operative to prevent messages from being sent between the virtual component and the first channel endpoint in response to detecting an invalid association between the virtual hardware component and the first channel endpoint.

15. The system of claim 13, wherein the virtual hardware component is a first virtual component, the system further comprising a second virtual hardware component operative to communicate a message directly with an associated process at the first node.

16. The system of claim 15, wherein the second virtual hardware component and the first virtual hardware component are members of a common domain, domain membership being assigned through a privileged operation not adjustable by the first or second process, wherein the first and second virtual hardware components are operative to share the first channel endpoint of the first node, such that each of the first and second processes can communicate messages with at least one process at the second node.

17. The system of claim 13, further including a third channel endpoint at the first node, the third channel endpoint being operative to communicate messages with a fourth channel endpoint that resides at a node different from the first node.

18. The system of claim 17, wherein the virtual hardware component is a first virtual hardware component, the system further comprising a second virtual hardware component at the first node that is associated with the third channel endpoint through a privileged operation at the first node.

19. The system of claim 18, wherein each of the first and third channel endpoints belongs to different domains, such that each communication channel established between associated channel endpoints in one of the domains is isolated from each communication channel established between associated channel endpoints in each other of the domains.

20. The system of claim 18, wherein each of the first and third channel endpoints belongs to a common domain, such that each of the first and second processes at the first node is operative to share first and third channel endpoints to respectively communicate a message with at least one process at the second and third nodes based on data in the respective message.

21. A system to facilitate communication of data, comprising:
- storage means for receiving a message provided directly from a user-level process;
- communication means associated with the storage means for, upon validation of a common domain association between the storage means and the communication means, sending the stored request to a corresponding communication means at another node in the system; and
- validation means for validating the association between the storage means and the communication means, the storage means and the communication means being associated in a privileged operation not adjustable by user-level processes.

22. A system to facilitate communication of data, comprising:
- virtual storage means at a first node for storing a message for direct communication relative to a user-level process;
- endpoint communication means at the first node for means for, upon determining a common domain membership for the storage means and the endpoint communication means, enabling communication between the virtual storage means and the endpoint communication means; and
- control means for independently controlling domain membership for each of the virtual storage means and the endpoint communication means.

23. The system of claim 22, wherein the endpoint communication means further includes means for preventing communication of messages between the virtual storage means and the endpoint communication means in the absence of a common domain membership among virtual storage means and the endpoint communication means.

24. The system of claim 22, wherein the endpoint communication means further includes means for permitting communication of messages between the virtual storage means and the endpoint communication means when common domain membership exists among virtual storage means and the endpoint communication means.

25. A computer-readable medium having computer-executable instructions for:
- in a privileged mode, setting domain membership for a queue of a first node and setting domain membership for a communication component of the first node, the communication component of the first node being operable to communicate messages with a corresponding communication component at a second node, the domain membership being inaccessible by user-level processes, the queue being mapped into memory of an associated user-level process at the first node, such that the user-level process can communicate directly with the queue; and
- controlling communication of message between the queue and the communication component based on the domain membership set for each of the queue and the communication component being the same.

26. The computer-readable medium of claim 25 having further computer-executable instructions for providing an error message to the associated user-level process if the domain membership between the queue and the communication component is invalid.

27. The computer-readable medium of claim 25 having further computer-executable instructions for analyzing the message to identify which of a plurality of communication contexts is designated and validating domain membership between the queue and the designated communication context to control communication of the message between the queue and the designated communication context.

28. A method to facilitate communication in a system architecture in which a process is operative to communicate a message directly with a storage component coupled to at least one local communications component in a node for communicating the message for receipt by a second communications component, the method comprising:

associating the storage component with a domain for temporarily storing the message;

associating the local communications component with a domain; and     controlling communication of a message between the storage component and the local communications component based on the domain of the storage component and the domain of the local communications component being identical.

29. The method of claim 28, wherein the domain for the storage component and the domain for the association of the local communications component are implemented independently in privileged operation not adjustable by the user-level process.

30. The method of claim 29, wherein the controlling further comprises validating the domain of the storage component relative the domain of the local communication component.

31. The method of claim 30, further comprising preventing communication of the message from the storage component to the communication component in the absence of a match between the domain of the storage component and the domain of the communication component.

32. The method of claim 31, further comprising generating an error message in the absence of a match between the domain of the at least part of the storage component and the domain of the communication component.

33. The method of claim 31, further comprising sending the message from the storage component to the communication component in response to a valid association existing between the domain of the storage component and the domain of the communication component.

34. The method of claim 29, further comprising discerning from the message which of at least one of a plurality of communication components is designated and validating association between the storage component and each designated communication component to control communication of the message between the storage component and each designated communication component.

* * * * *